(12) United States Patent
Hilla, Jr. et al.

(10) Patent No.: US 6,775,083 B2
(45) Date of Patent: Aug. 10, 2004

(54) SYSTEM FOR IMPROVING ACCURACY OF SERVO PATTERN TIMING REFERENCE IN A DISC DRIVE

(75) Inventors: Ralph J. Hilla, Jr., Burnsville, MN (US); Michael A. Zenner, Faribault, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 184 days.

(21) Appl. No.: 09/995,018

(22) Filed: Nov. 26, 2001

(65) Prior Publication Data

US 2002/0196571 A1 Dec. 26, 2002

Related U.S. Application Data (60) Provisional application No. 60/301,038, filed on Jun. 26, 2001.

(51) Int. Cl.[7] .................................................. G11B 5/09
(52) U.S. Cl. .......................................... 360/51; 360/53
(58) Field of Search .............................. 360/51, 75, 48, 360/31

(56) References Cited

U.S. PATENT DOCUMENTS 3,540,022 A * 11/1970 Berger .......................... 360/51

5,757,857 A  5/1998 Buchwald .................... 375/271
5,796,541 A  8/1998 Stein et al. .................... 360/75
5,978,426 A  11/1999 Glover et al. ................ 375/376

OTHER PUBLICATIONS

Interpolated Timing Recovery for Hard Disk Drive Read Channels by Mark Spurbeck et al. 1997 IEEE International Conference on Communications Towards the Knowledge Millennium, pp 1618–1624.
A Novel Stability Analysis of a PLL for Timing Recovery in Hard Disk Drives by Alessandro De Gloria et al. IEEE Transactions on Circuits and Systems–I: Fundamental Theory and Applications, vol. 46 No. 8, Aug. 1999, pp. 1026–1031.

* cited by examiner

Primary Examiner—David Hudspeth
Assistant Examiner—Rocio Colon
(74) Attorney, Agent, or Firm—Fellers, Snider, et al.

(57) ABSTRACT

It is generally believed that, the more pure the servo pattern timing reference, the better. A system writes a servo clock track on a disc in a disc drive. The clock track is written on the disc and the servo system is configured to reduce a splice error in a timing signal based on the clock track. The system is also configured to reduce phase-locked oscillator (PLO) jitter in the timing signal.

In one embodiment, the splice error and PLO jitter are both measured using a single phase measurement circuit.

21 Claims, 5 Drawing Sheets

SYSTEM FOR IMPROVING ACCURACY OF SERVO PATTERN TIMING REFERENCE IN A DISC DRIVE

CROSS-REFERENCE TO RELATED APPLICATION

Reference is hereby made to, and priority is hereby claimed from, U.S. provisional patent application serial No. 60/301,038 filed on Jun. 26, 2001, entitled SERVO TRACK WRITER SERVO PATTERN TIMING REFERENCE.

FIELD OF THE INVENTION

The present invention relates to disc drives. More specifically, the present invention relates to improving the accuracy of a servo pattern timing reference on a disc in a disc drive.

BACKGROUND OF THE INVENTION

Disc drives illustratively include data transducers located relative to disc surfaces of rotatable discs in a disc stack. The data transducers are provided with a write signal to encode data on the disc surface. When the disc surface is moved relative to the data transducer, the data transducer generates a read signal indicative of data which has already been encoded on the disc.

In order to write data to the disc, a servo system is used to position the data head at one of a plurality of concentric tracks on the disc surface. A disc drive controller then provides information which generates the write signal that is provided to the data transducer. The data transducer thus encodes data on the disc surface at the desired track location.

When a read operation is to be performed, the servo system again positions the data transducer relative to a desired track on the disc surface. The data transducer then generates a read signal indicative of information encoded on the track over which the data transducer is positioned. This information is provided back to the drive controller which identifies data based on the read signal received.

It can thus be seen that, in order to perform a read or write, the servo system must perform a track following operation. In a track following operation, the servo system holds the data transducer over a track on the disc surface, while the disc rotates, to read data from, or write data to, the disc surface. In order to access a desired portion of the disc surface, the servo system must perform a track seek operation. In the track seek operation, the servo system moves the data transducer radially relative to the disc surface to a desired one of the concentric tracks to be accessed.

In order to accomplish positioning of the data head relative to the disc track, servo information written on the disc track by an external servo writer is utilized. The servo information includes a timing reference also known as a clock track. The clock track is written to the disc using one, common, crystal-generated frequency. The clock track is used as a reference for motor speed control and for servo pattern generation. One full revolution corresponding to the clock track is determined by an index which is included on the motor controller. The clock track is, itself, written with an encoded index.

As servo pattern frequency continues to increase, and as the discs continue to rotate at higher RPMs, the frequency capability of the head/disc interface has increased as well. Thus, the timing accuracy of the timing reference system used to generate the written patterns on the disc becomes increasingly critical.

When the clock track is written in a single revolution, it is very difficult to maintain the phase of the clock signal precisely accurate such that the beginning of the clock track exactly coincides with the ending of the clock track. For example, if the clock track is simply written with a raw timing source, variations in the oscillator frequency and variations in the disc RPM can make it extremely difficult, if not impossible, to make the beginning and end of the clock track precisely coincide with no phase difference. The phase difference at the starting/ending of the clock track is referred to as the splice phase error or simply splice error.

Traditionally, phase locked oscillators (PLOs) have been used in disc drives in order to lock on to the timing reference for pattern generation, etc. At the end of the clock track, if the splice error were fed into the PLO, this can cause frequency modulation. As the timing reference is scaled up to frequencies used by the remainder of the drive, this can cause many problems.

While the PLO can be designed to address certain errors, if the PLO were designed to specifically address the splice error, this would lead to many other difficulties. For example, the PLO is commonly designed to address many considerations, such as misplaced bits, mechanical resonance at various frequencies, etc. Thus, the splice error continues to present problems.

In addition, PLO jitter can also be a problem. PLO jitter refers to the phase difference between the raw clock track signal input to the PLO and the output from the PLO. Jitter can be increased for many reasons. For example, background noise simply due to the electronics operating and switching in the system, can lead to increased jitter in the PLO as the read head travels around the clock track.

Similarly, many current disc drive manufactures have products which must operate at many different frequencies. Various different frequencies can lead to increased PLO jitter as well. In addition, the drive may be required to operate at different frequencies to check various aspects of the drive, such as bearing performance, windage, spring biases, head ringing due to suspension structural mode excitation, etc. The PLO jitter may be different at each of these frequencies.

The present invention addresses one or more of these disadvantages and offers one or more advantageous features over the prior art.

SUMMARY OF THE INVENTION

It is generally believed that, the more pure the servo pattern timing reference, the better. A system writes a servo clock track on a disc in a disc drive. The clock track is written on the disc and the servo system is configured to reduce a splice error in a timing signal based on the clock track. The system is also configured to reduce phase-locked oscillator (PLO) jitter in the timing signal.

In one embodiment, the splice error and PLO jitter are both measured using a single phase measurement circuit. These and various other features as well as advantages which characterize the present invention will be apparent upon reading of the following detailed description and review of the associated drawings.

DETAILED DESCRIPTION OF ILLUSTRATIVE EMBODIMENTS

Figure 1:
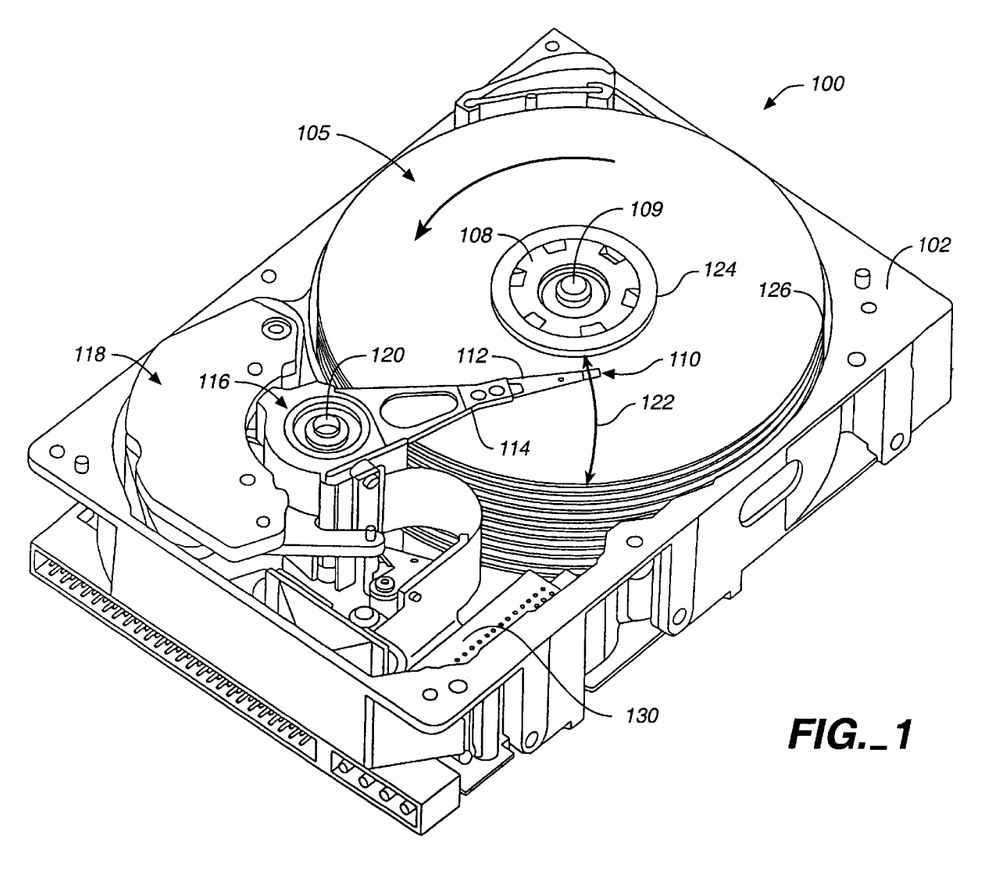
FIG. 1 is an isometric view of a disc drive.

FIG. 1 illustrates an embodiment of a disc drive storage device 100. Disc drive 100 includes a housing 102 that houses a disc pack 126 secured by clamps 124 to a spindle motor 108 and having storage surfaces 105 that are illustratively layers of material (such as magnetic material or optically readable material). The disc pack 126 includes a stack of multiple discs each accessible by a read/write assembly 112 which includes a transducer or head 110. Spindle motor 108 drives rotation of the discs in disc pack 126 in a direction of rotation about spindle 109. As discs 126 are rotated, read/write assembly 112 accesses different rotational locations on the storage surfaces 105 in disc pack 126. Read/write assembly 112 is actuated for radial movement relative to the disc surfaces, such as in a direction indicated by arrow 122, in order to access different tracks (or radial positions) on the disc surfaces. Such actuation of read/write assembly 112 is illustratively provided by a servo system which includes a voice coil motor (VCM) 118. Voice coil motor 118 includes a rotor 116 that pivots on axis 120. VCM 118 also illustratively includes an arm 114 that supports the read/write head assembly 112.

Disc drive 100 illustratively includes control circuitry 130 for controlling operation of disc drive 100 and for transferring data in and out of the disc drive 100. The servo data written to the disc surface 105 by the servo writer includes position data indicative of a position of the data head and a clock track. The clock track has clock pulses which are used by the control circuitry to lock on to the data written to the disc in a known manner.

Figure 2:
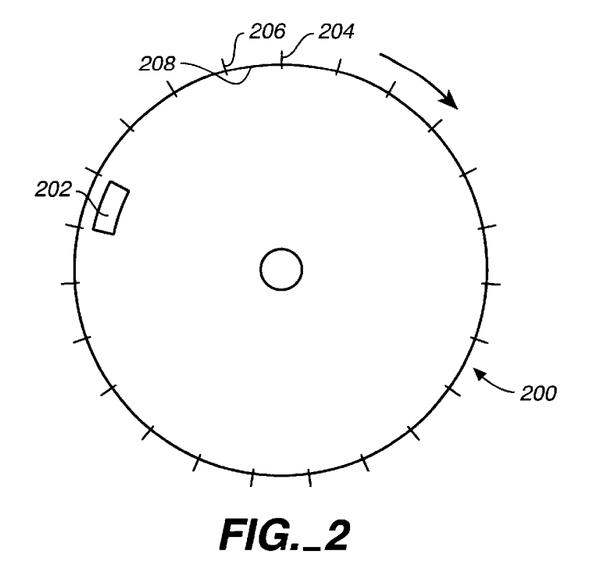
FIG. 2 is a diagrammatic view of a surface of a disc.

FIG. 2 is a diagrammatic top view of a disc surface showing a clock track 200 which includes an encoded index 202. Clock track 200 has a start 204 and an end 206. Ideally, start 204 and end 206 of clock track 200 would correspond exactly to the same position on the surface of the disc. However, this is not often the case, and the difference is referred to as the splice error 208.

Figure 3:
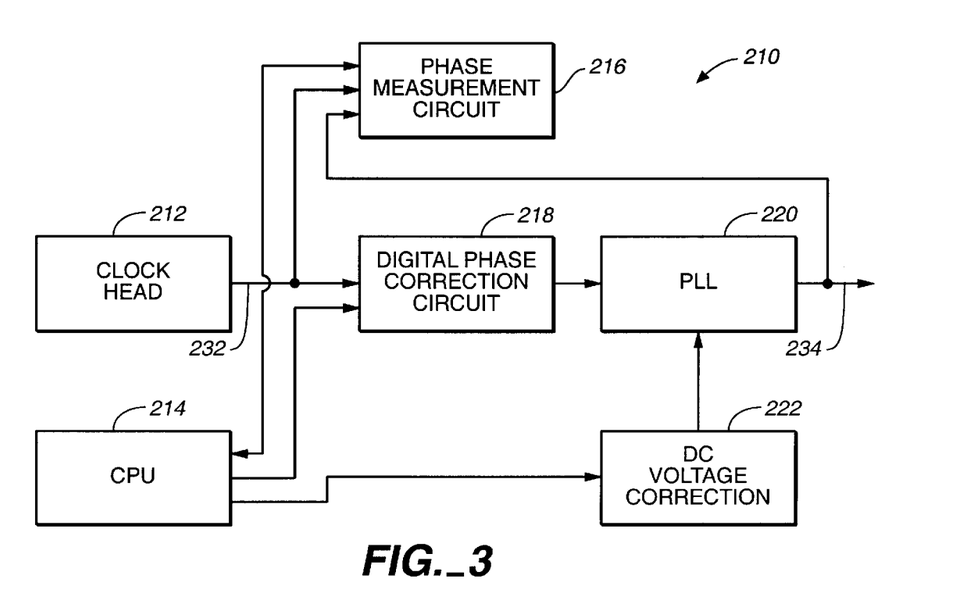
FIG. 3 is a block diagram illustrating one embodiment of the present invention.

FIG. 3 shows a block diagram of a system 210 used to compensation for, or correct, splice error 208. System 210 includes clock head 212, which is the data head tracking over clock track 200. System 210 also includes CPU 214 which controls the servo writing process implemented by the servo writer. System 210 further includes phase measurement circuit 216, digital phase correction circuit 218, phase-locked loop (PLL) 220 (which includes a phase-locked oscillator or PLO), and DC voltage correction register 222.

Figure 4:
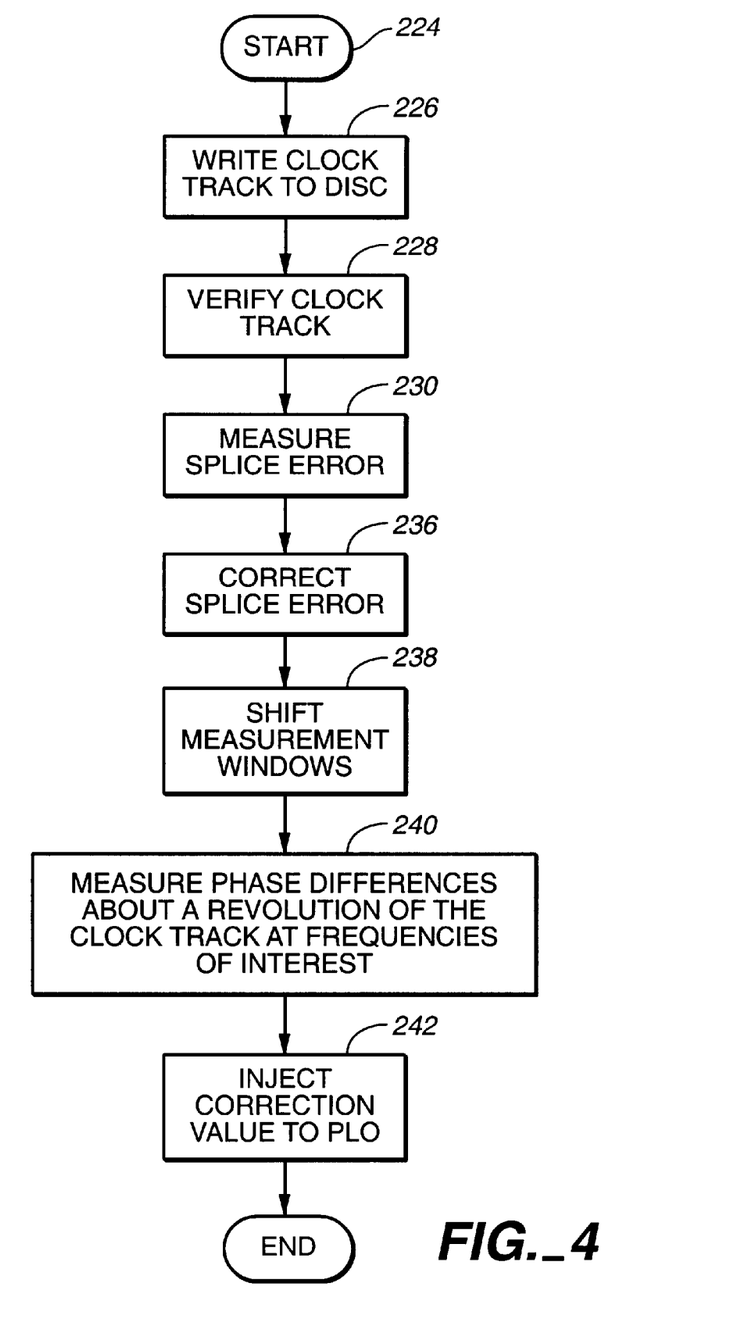
FIG. 4 is a flow diagram illustrating the operation of the system shown in FIG. 3.

FIG. 4 is a flow diagram illustrating the operation of system 210. First, CPU 214 controls the servo writing electronics to write clock track 200 to the disc, in a conventional manner. This is indicated by blocks 224 and 226. During this process, as indicated with respect to FIG. 2, an index 202 is encoded on the clock track. One complete revolution for the clock track is determined based on an index on the motor controller in the servo writing electronics.

Once the clock track is written, CPU 214 verifies the clock track as indicated by block 228. In order to verify the clock track 200, CPU 214 first determines whether the clock track has met a number of preconditions. If so, verification circuitry is enabled for further verifying the clock track. For example, to test the first two preconditions, CPU 214 first determines whether the number of clock pulses encoded on the disc surface meets a predetermined threshold. If so, CPU 214 measures an analog control input to the phase-locked oscillator to determine whether it is in a predetermined voltage range. This gives some indication as to whether the PLO can lock on to the clock track.

Once these two preconditions are met, a number of other evaluations are performed in order to verify the clock track. First, the phase relation of the PLO input to the PLO output is measured to determine whether the input is within a predetermined percentage of the output. Next, the pulses on the clock track are re-counted using the decoded clock track index instead of the motor index to indicate the beginning of the clock track. Finally, the uncorrected timing of the clock track at the splice is measured to determine whether it is within a predetermined range of nominal.

If all these evaluations are performed and turn out to be satisfactory, then CPU 214 controls system 210 to measure the splice error 208. This is indicated by block 230. In order to measure this splice error, clock head 212 tracks over clock track 200 and provides a raw clock data signal 232 to phase measurement circuit 216. Digital phase correction circuit 218 is programmed by CPU 214 to refrain from making any correction, and the raw clock data signal is provided to phase-locked loop 220. Phase measurement circuit 216 measures the phase difference between the raw clock data signal 232 and the output 234 from phase-locked loop 220. This measured phase difference is provided to CPU 214. Based on the phase difference, CPU 214 determines the splice error 208.

Having determined the splice error, CPU 214 then corrects the splice error as indicated by block 236 in FIG. 4. The splice error is corrected by CPU 214 by loading a splice error correction value into digital phase correction circuit 218. Correction circuit 218 thus corrects the phase of raw clock data signal 232 before it is provided to PLL 220. The measurement and correction of the splice error is discussed in greater detail with respect to FIGS. 5 and 6.

Once the splice error has been corrected, CPU 214 then performs noise rejection, or PLO jitter correction. In order to do this, CPU 214 first programs phase measurement circuit 216 to shift the measurement window to various locations around the circumference of clock track 200. Measurement circuit 216 thus measures the phase difference between the raw clock data signal 232 and the output of PLL 220 at various locations around the clock track 200. This is done at various frequencies of interest as indicated by block 240. These measurements essentially provide a measurement of PLO jitter at various frequencies around clock track 200.

Based on these measurements, CPU 214 calculates a DC correction value to improve performance of PLL 220 at the frequencies of interest. This correction value is loaded into DC voltage correction register 222 for injection into PLL 220. Injection of the DC correction value into PLL 220 is indicated by block 242 in FIG. 4. Measurement and correction of PLO jitter is described in greater detail with respect to FIGS. 5 and 7.

Figure 5:
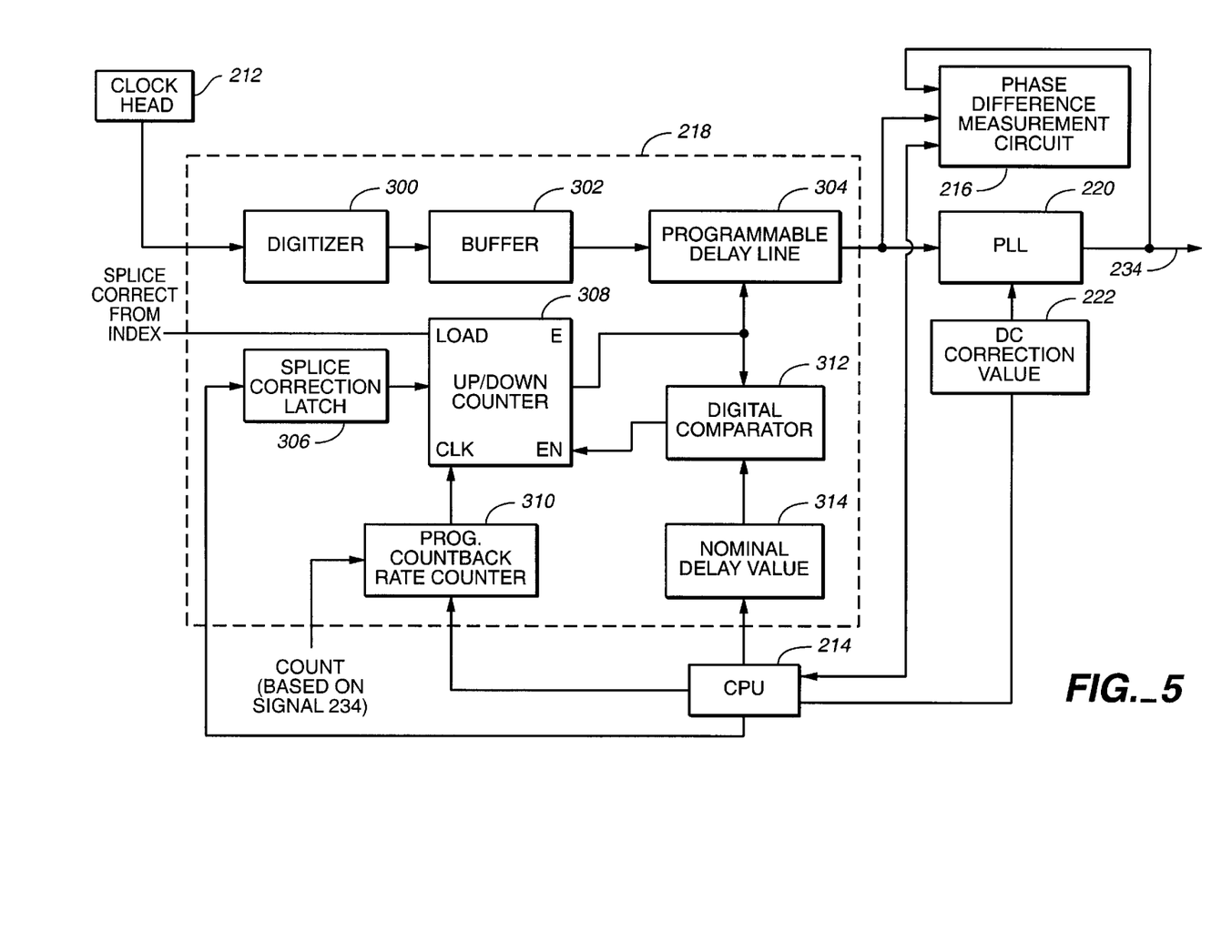
FIG. 5 is a more detailed block diagram in accordance with one embodiment of the present invention.

FIG. 5 is a more detailed block diagram of system 210 shown in FIG. 3, and similar items are similarly numbered. FIG. 5 specifically shows that digital phase correction circuit 218 includes digitizer 300, buffer 302, programmable delay line 304, splice correction latch 306, up/down counter 308, programmable count-back rate counter 310, digital comparator 312 and nominal delay value register 314.

Figures 6, 7:
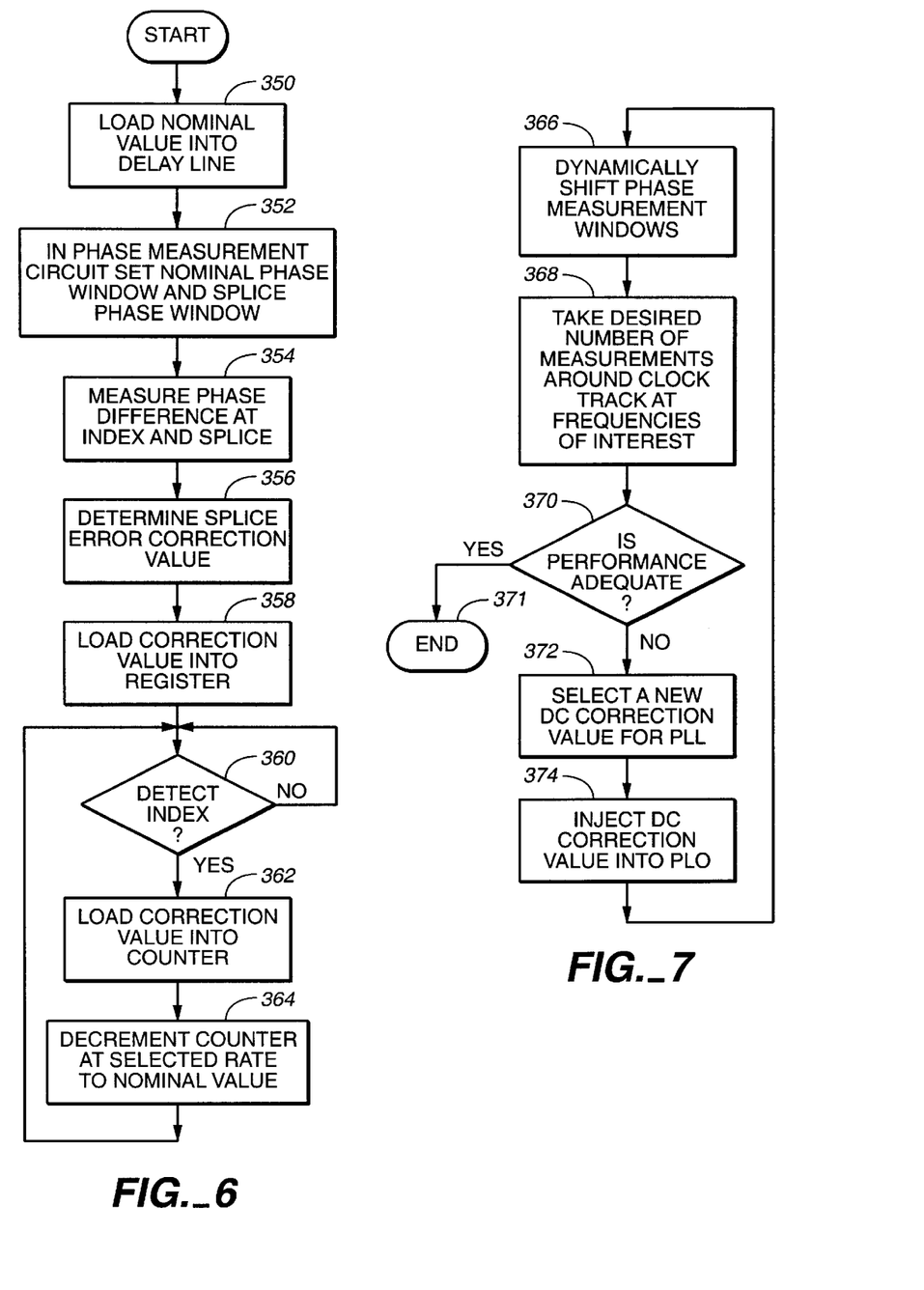
FIG. 6 is a flow diagram illustrating the operation of the system shown in FIG. 5.
FIG. 7 is a flow diagram illustrating jitter compensation or noise rejection, in accordance with one embodiment of the present invention.

FIG. 6 is a flow diagram which illustrates the correction of the splice error in greater detail. Initially, CPU 214 configures the circuit to load programmable delay line 304 with a nominal value which places programmable delay line 304 at the center of its range. This is indicated by block 350 in FIG. 6. CPU 214 then programs phase difference measurement circuit 216 to set two measurement windows. The first measurement window is a nominal phase window which opens between index 202 and the splice. The second window is a splice phase window. The splice phase window occurs at an area which captures splice error 208. In one illustrative embodiment, index 202 is written approximately pulses prior to the end of the revolution. Thus, both windows can be located appropriately based on the location of index 202. Setting the phase measurement windows is indicated by block 352 in FIG. 6.

The phase difference is then measured at the index and the splice, in the two phase measurement windows. This is indicated by block 354. This is done by receiving the clock data signal from clock head 212, digitizing it in digitizer 300, buffering it in buffer 302 and providing it through programmable delay line 304 which is initially set to its nominal value. The output of programmable delay line 304 is provided to phase difference measurement circuit 216. When either phase measurement window is open, the first clock track signal (e.g., rising edge) switches a constant current source to charge a capacitor. The next clock edge on the output of PLL 220 stops charging of the capacitor. Therefore, the value on the capacitor after being charged is proportional to the phase time difference between the raw clock track signal and the output of the PLO in PLL 220 which is locked on to the clock signal. This is done for both phase measurement windows.

The capacitor value measured for the nominal phase widow provides a nominal phase time difference between the clock track data and the output of the PLO in PLL 220. The capacitor value for the splice phase window gives the protracted or contracted phase time difference at the splice. By considering both of these values, CPU 214 determines the specific phase error caused by the splice error, and can thus determine the correction value as indicated by block 356 in FIG. 6.

Once the splice error correction value is determined, it is loaded into splice correction latch 306. This is indicated by block 358. It can be seen that the output of up/down counter 308 is provided to programmable delay line 304 and thus controls the delay of programmable delay line 314.

Initially, up/down counter 308 is loaded with a nominal delay value such that programmable delay line 304 provides its nominal delay. In one illustrative embodiment, the splice error is corrected by loading a correction value into delay line 304 at the beginning of the revolution of the clock track, and then adjusting that level such that the splice error is corrected, or distributed, throughout an entire revolution of clock track 200. In order to accomplish this, up/down counter 308 receives a splice correct signal which is keyed from the index 202 on the clock track. Thus, the index is detected and, at a predetermined offset from the index, the splice correct signal becomes active and loads the splice correction value from latch 306 into counter 308. This is indicated by blocks 360 and 362 in FIG. 6.

Then, during a subsequent revolution around clock track 200, programmable count-back rate counter 310 provides a clock output to counter 308 decrementing counter 308 back to the nominal delay value. The rate at which counter 308 is decremented during the revolution around clock track 200 is a function of the clock signal based on the clock track 200 and is programmable by CPU 214. Thus, the rate at which the splice error is distributed about the entire revolution of clock track 200 can be varied simply by reprogramming count-back rate counter 310.

When the output of counter 308 reaches the nominal delay value, digital comparator 312 provides a count disable signal to counter 308 such that counter 308 will no longer decrement based on the output from counter 310.

However, at the next index, the splice correct signal will go active (again within a predetermined offset of the index) such that up/down counter 308 will be loaded with the splice correction value from latch 306. Of course, digital comparator 312 then provides an enable signal to counter 308 enabling it to be decremented by the output of counter 310. Thus, the process of correction for, and spreading, the splice error about the clock track is repeated for every revolution of the clock track. Decrementing the counter at the selected rate to the nominal value is indicated by block 364 in FIG. 6.

The preceding example speaks to decrementing counter 308. However if the splice correction value requires, counter 308 can be loaded with a number less than the nominal value, and then be incremented around the revolution of the clock track back up to the nominal level.

It should also be noted that CPU 214 can iterate on this process, changing the splice error correction value and the programmable count-back rate until the splice error is corrected to within a predetermined range of nominal. It should further be noted that this process may illustratively be repeated for each clock track in the disc drive system.

Having corrected the splice error, system 200 is now configured to measure and correct for PLO jitter. FIG. 7 is a flow diagram illustrating this process in more detail.

In order to accommodate for PLO jitter, CPU 214 programs phase difference measurement circuit 216 to dynamically shift the phase measurement windows to various portions about the circumference of clock track 200. Thus, measurement circuit 216 measures the phase difference between the clock track signal (corrected for splice error) and the output of the PLO in PLL 220. This measurement is taken numerous times around the circumference of clock track 200, and may be taken several hundred, or several thousand times, as desired. The measurements can also be taken at different frequencies of interest. Dynamically shifting the phase measurement windows and taking a desired number of measurements at frequencies of interest is indicated by blocks 366 and 368 in FIG. 7.

These measurements illustratively provide a measure of PLO jitter found in the system, which can be illustrative of noise rejection, or PLO performance. CPU 214 then determines whether this performance is adequate as indicated by block 370 in FIG. 7. If so, the PLO jitter has been adequately corrected. If not, however, then a DC correction value is selected by CPU 214 based on the degree of PLO jitter exhibited. The DC correction value is loaded into DC value register 222. This value thus injects a DC correction value into the PLO in PLL 220. Selecting and injecting the correction value is indicated by blocks 372 and 374 in FIG. 7.

Having injected a new DC correction value into PLL 220, processing repeats at step 366 where the measurement windows are dynamically shifted and measurements are taken for PLO jitter around the circumference of clock track 200. Again, it is determined whether the performance is adequate. If so, CPU 214 concludes the PLO jitter correction as indicated by block 371. If not, however, a new DC correction value is loaded into register 222. Of course, CPU 214 can interate on this process and perform it at different frequencies of interest, using different DC correction values and even a different number of correction measurements until performance is deemed adequate at the frequencies of interest.

The present invention can be implemented as a method of writing a servo clock track 200 on a disc drive 100. The method can include writing the clock track 200 on a disc surface in the disc drive 100. The method further includes configuring servo electronics 210 in the disc drive 100 to reduce a splice error 208 in a timing signal based on the clock track 200. The method further includes configuring the servo electronics 210 to reduce phase-locked oscillator (PLO) jitter in the timing signal 234.

Reducing the PLO jitter can include measuring a phase difference between an input to the PLO in PLL 220 and an output 234 from PLL 220 at a plurality of points on the clock track 200. Reducing PLO jitter can further include calculating a correction value based on the measured phase differences.

Reducing PLO jitter can further include injecting the correction value 222 into the PLO 220. Of course, reducing PLO jitter can further include iterating on these steps and performing the steps at a plurality of different frequencies (such as at blocks 370–374).

The step of reducing the splice error can also include measuring the splice error 208 for the clock track 200, calculating the splice error correction value to reduce the splice error (such as at block 356), and configuring the servo electronics 210 to accommodate for at least a portion of the splice error 208.

In one embodiment of the present invention, measuring the splice error 208 and measuring PLO jitter are performed using these same measurement circuit 218.

The present invention can also be embodied as a method of configuring a servo data reading system in a disc drive which includes measuring a splice error 208 in a servo timing reference 200 on a disc in the disc drive 100. The method includes programming the servo data reading system 210 with a splice correction value reducing the splice error 208 read from the disc. The method further includes measuring a PLO jitter error in the servo timing reference 200, and programming the servo data reading system 210 with a jitter correction value 222 reducing the jitter error read.

The present invention can also be implemented as a servo system 210 in a disc drive 100, which includes a disc 126 and means for correcting splice error and jitter in a timing reference in the servo system 210. The means for correcting can include a phase measurement circuit 216 configured to measure the splice error 208 and the jitter, and a correction register 222 holding a jitter correction value.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo system while maintaining substantially the same functionality without departing from the scope and spirit of the present invention. In addition, although the preferred embodiment described herein is directed to a disc for a disc drive system, it will be appreciated by those skilled in the art that the teachings of the present invention can be applied to other systems, like optical systems, without departing from the scope and spirit of the present invention.

What is claimed is:

1. A method of writing to a storage surface comprising steps of:
   (a) writing a clock track on the storage surface;
   (b) configuring electronics to reduce a splice error in a timing signal based on the clock track by measuring the splice error; and
   (c) configuring the electronics to reduce a phase-locked oscillator (PLO) jitter in the timing signal.

2. The method of claim 1 wherein the configuring step (c) comprises:
   (c1) measuring a phase difference between an input to the PLO and an output from the PLO at a plurality of points on the clock track.

3. The method of claim 2 wherein the configuring step (c) comprises:
   (c2) calculating a correction value based on the measured phase difference.

4. The method of claim 3 wherein the configuring step (c) comprises:
   (c3) injecting the correction value into the PLO.

5. The method of claim 4 wherein the configuring step (c) comprises:
   (c4) iterating on steps (c1) and (c2).

6. The method of claim 4 wherein the configuring step (c) comprises:
   (c5) performing steps (c1) and (c2) at a plurality of different frequencies.

7. The method of claim 1 wherein the configuring step (b) comprises:
   (b2) calculating a splice error correction value to reduce the splice error.

8. The method of claim 7 wherein the configuring step (b) comprises:
   (b3) configuring the servo electronics to accommodate for at least one portion of the splice error.

9. The method of claim 1 wherein the measuring steps (b1) and (c1) are performed using one phase measurement circuit.

10. A method of configuring a servo data reading system, comprising steps of:
    (a) measuring a splice error in a servo timing reference on a storage surface;
    (b) programming the servo data reading system with a splice correction value reducing the splice error in a timing signal based on the servo timing reference;
    (c) measuring a phase-locked oscillator (PLO) jitter error in the servo timing reference; and
    (d) programming the servo data reading system with a jitter correction value reducing the PLO jitter error in the timing signal.

11. The method of claim 10 wherein the measuring step (c) comprises:
    (c1) measuring a phase difference between an input to the PLO and an output from the PLO at a plurality of points on the clock track.

12. The method of claim 11 wherein the measuring step (c) comprises:
   (c2) calculating a correction value based on the measured phase difference.

13. The method of claim 12 wherein the measuring step (c) comprises:
   (c3) injecting the correction value into the PLO.

14. The method of claim 13 wherein the measuring step (c) comprises:
   (c4) performing steps (c1) and (c2) at a plurality of different frequencies.

15. The method of claim 14 wherein the measuring step (a) comprises:
   (a1) measuring a splice error for the clock track.

16. The method of claim 15 wherein the measuring step (a) comprises:
   (a2) calculating a splice error correction value to reduce the splice error.

17. The method of claim 16 wherein the measuring step (a) comprises:
   (a3) configuring the servo electronics to accommodate for at least one portion of the splice error.

18. The method of claim 10 wherein the measuring steps (a1) and (c1) are performed using one phase measurement circuit.

19. A storage system, comprising:
   a storage surface; and
   means for correcting a splice error and a jitter in a timing reference in the storage system by measuring the splice error.

20. The storage system of claim 19 wherein the means for correcting comprises:
   a phase measurement circuit configured to measure the splice error and the jitter.

21. The storage system of claim 19 wherein the means for correcting comprises:
   a correction register holding a jitter correction value.

* * * * *